(12) United States Patent
Jiang

(10) Patent No.: US 9,988,030 B2
(45) Date of Patent: Jun. 5, 2018

(54) ELECTROMECHANICAL-MAGNETICALLY INTEGRATED BRAKING ASSISTANCE DEVICE

(71) Applicant: NINGBO TUOPU INTELLIGENT BRAKE SYSTEM CO., LTD., Zhejiang (CN)

(72) Inventor: Kaihong Jiang, Zhejiang (CN)

(73) Assignee: NINGBO TUOPU INTELLIGENT BRAKE SYSTEM CO., LTD., Zhejiang (CN)

( * ) Notice: Subject to any disclaimer, the term of this patent is extended or adjusted under 35 U.S.C. 154(b) by 0 days. days.

(21) Appl. No.: 15/371,155

(22) Filed: Dec. 6, 2016

(65) Prior Publication Data

US 2017/0158181 A1 Jun. 8, 2017

(30) Foreign Application Priority Data

Dec. 7, 2015 (CN) .......................... 2015 1 0890617

(51) Int. Cl.
*B60T 8/48* (2006.01)
*B60T 13/74* (2006.01)
*F16D 65/18* (2006.01)
*B60T 7/04* (2006.01)
*F16D 55/225* (2006.01)
(Continued)

(52) U.S. Cl.
CPC ............ *B60T 13/741* (2013.01); *B60T 7/042* (2013.01); *B60T 13/745* (2013.01); *F16D 65/18* (2013.01); *B60T 2270/82* (2013.01); *F16D 55/225* (2013.01); *F16D 2121/24* (2013.01); *F16D 2125/36* (2013.01)

(58) Field of Classification Search
CPC .... B60T 13/662; B60T 13/741; B60T 13/745; F16D 65/18
USPC .......................... 303/114.1, 114.3, 115.2, 155
See application file for complete search history.

(56) References Cited

U.S. PATENT DOCUMENTS 6,240,797 B1 * 6/2001 Morishima ......... F16H 25/2454
188/134
8,468,820 B2 * 6/2013 Drumm ................... B60T 7/042
60/545

(Continued)

*Primary Examiner* — Christopher P Schwartz
(74) *Attorney, Agent, or Firm* — JCIPRNET

(57) ABSTRACT

The invention relates to an electromechanical-magnetically integrated braking assistance device, comprising an electrical motor, an oil holder, a braking main cylinder, an assistant force generating portion, and a pedal input rod, an absolute displacement sensor or a relative displacement sensor is connected to the pedal input rod; a lead screw is sleeved over the pedal input rod, and a ball nut is sleeved over the lead screw; a ball nut bushing is fixed to the ball nut by being sleeved over the ball nut; a driven gear is fixed to the ball nut bushing by being sleeved over the ball nut bushing; and the electric motor meshes with the driven gear via a transmission mechanism. An end of the lead screw which passes through the ball nut bushing has an aperture, into which a feedback disc is installed; an end of the feedback disc is connected to an end of an output rod which is coaxially arranged with the lead screw inside the assistant force generating portion, and another end of the output rod extends into the braking main cylinder and is connected to a piston of the braking main cylinder.

12 Claims, 2 Drawing Sheets

(51) Int. Cl.
  *F16D 121/24* (2012.01)
  *F16D 125/36* (2012.01)

(56) References Cited

U.S. PATENT DOCUMENTS

| | | | | |
|---|---|---|---|---|
| 8,540,324 B2* | 9/2013 | Leiber | ................... | B60T 7/042 303/113.4 |
| 2002/0158510 A1* | 10/2002 | Kobayashi | ................ | B60L 1/00 303/152 |
| 2009/0045672 A1* | 2/2009 | Nishino | ................. | B60T 7/042 303/113.3 |
| 2010/0176652 A1* | 7/2010 | Arakawa | ................... | B60T 1/10 303/10 |
| 2013/0197771 A1* | 8/2013 | Takeda | ................. | B60T 13/745 701/70 |
| 2013/0291534 A1* | 11/2013 | Ohtani | .................... | B60T 7/042 60/545 |
| 2014/0090371 A1* | 4/2014 | Yoshizu | ............... | B60T 13/745 60/545 |

\* cited by examiner

ELECTROMECHANICAL-MAGNETICALLY INTEGRATED BRAKING ASSISTANCE DEVICE

CROSS-REFERENCE TO RELATED APPLICATION

This application claims the priority benefit of China application serial no. 201510890617. X, filed on Dec. 7, 2015. The entirety of the above-mentioned patent application is hereby incorporated by reference herein and made a part of this specification.

FIELD OF THE INVENTION

The invention relates to the field of automotive braking assistance device, and in particular to an electromechanical-magnetically integrated braking assistance device.

BACKGROUND OF THE INVENTION

Automotive braking assistance device is an important system of an automobile. During the traveling of an automobile, an assistance device is required for providing assistant force in case of braking, so that the driver can brake the automobile easily. Existing braking assistance devices mostly use a vacuum booster to providing the assistant force. However, the vacuum booster is largely affected by atmospheric pressure, and may even lead to an insufficient braking force, thus considerably reducing safety factor. Moreover, once the assistant force has failed, there is no way to use manual braking, thus decreasing safety margin. From a long-term point of view, the development and application of electric motor technology provides a broader path for realizing the recycling of braking energy; the application of control system makes the active braking technology more perfect; meanwhile, the application of electromechanical-magnetically integrated synthesized technology can meet requirements on the development of self-adaptive cruising system, the ensuring a more comfortable and safer driving.

SUMMARY OF THE INVENTION

The technical problem to be solved by the invention is to provide an electromechanical-magnetically integrated braking assistance device, which is simple in structure; by using an electromechanical-magnetically integrated way, all the characteristics of a conventional vacuum booster have reappeared, and meanwhile the reliability of assistant force is increased, thus ensuring the stability and following characteristic during the braking process.

The invention solves the technical problem by using the following technical solution: an electromechanical-magnetically integrated braking assistance device, comprising an electrical motor having a position sensor and an ECU, an oil holder, a braking main cylinder, an assistant force generating portion, and a pedal input rod, wherein an absolute displacement sensor or a relative displacement sensor is connected to the pedal input rod, and an end of the pedal input rod is inserted into the assistant force generating portion; a lead screw is sleeved over the pedal input rod, and a ball nut is sleeved over the lead screw; a ball nut bushing is fixed to the ball nut by being sleeved over the ball nut; a driven gear is fixed to the ball nut bushing by being sleeved over the ball nut bushing; and the electric motor meshes with the driven gear via a gear transmission mechanism or a belt; an end of the lead screw which passes through the ball nut bushing has an aperture, into which a feedback disc is installed and an anti-rotation rod is installed by being inserted radially, wherein an end of the feedback disc is connected to an end of an output rod which is coaxially arranged with the lead screw inside the assistant force generating portion, and another end of the output rod extends into the braking main cylinder and is connected to a piston of the braking main cylinder; and an upper end of the braking main cylinder is connected with the oil holder.

As a supplement to the above technical solution of the invention, an output end of the electric motor is installed with a drive gear which meshes with the a speed changing gear which in turn meshes with the driven gear.

As a supplement to the above technical solution of the invention, a pair of guide rods are arranged symmetrically at two sides of the ball nut bushing, and a guide connecting rod, two ends of which are sleeved over the guide rods, is sleeved over the lead screw between the feedback disc and the ball nut bushing.

Further, restoring springs are sleeved over both the pedal input rod and the output rod.

Further, the pedal input rod extends out of an end of the lead screw and is connected with an anti-rotation connecting block, and an end of the anti-rotation rod is connected with a side wall of the anti-rotation connecting block.

Further, a step is arranged at the outer side of an end of the ball nut bushing which is close to the feedback disc, a plurality of axially arranged sliding grooves are evenly provided around the circumference of the ball nut bushing, and a central hole of the driven gear is provided with protrusions for mating with the sliding grooves, wherein the driven gear abuts against the step and the protrusions are embedded into corresponding sliding grooves.

Further, a bearing is sleeved over the ball nut bushing which closely abuts against the driven gear, an inner ring of the bearing is embedded into the driven gear, and an outer ring of the bearing is embedded into a housing.

ADVANTAGEOUS EFFECTS

The invention relates to an electromechanical-magnetically integrated braking assistance device which uses an absolute displacement sensor or a relative displacement sensor to detect the braking intension of the driver. By using PID control, a displacement signal is analyzed, an absolute displacement amount and a relative displacement amount at the zero position of the pedal rod is calculated, and then the electric motor is controlled to rotate in a forward direction or in a reverse direction so as to apply a corresponding assistant force. By using a ball screw as a force-transmitting device, a rotating movement of the electric motor is transformed into a linear movement. By using a gear reduction mechanism or a belt, the rotating movement of the electric motor is converted to the ball screw. By using the anti-rotation mechanism, the lead screw is prevented from being rotated when the rotating movement is converted into the linear movement, which will otherwise result in a reduction in transmission efficiency. By using the feedback disc which is made from an elastic material, a smooth leap increase and a stable assistance ratio is realized. By using flanges on the gear to mate with grooves in the ball nut bushing, it is realized that the gear drives the ball screw to rotate, and meanwhile, it is ensured that when there is no assistant force, the ball screw can be successfully disengaged from the gear, thus realizing manual braking.

BRIEF DESCRIPTION OF THE ACCOMPANYING DRAWINGS

DETAILED DESCRIPTION OF THE PREFERRED EMBODIMENTS

The invention will be further explained with reference to the following specific embodiments. It should be understood that these embodiments are provided merely for illustrating the invention rather than limiting the scope of the invention. It should be further understood that upon reading the contents taught by the invention, those skilled in the art can make various variations or modifications to the invention, and these equivalents will also fall within the scope defined by the appended claims of the application.

Figure 1:
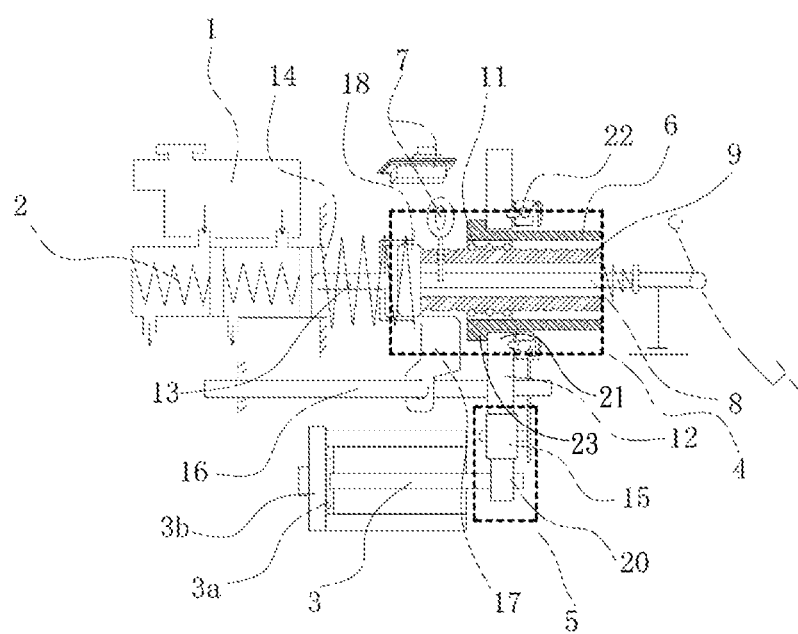
FIG. 1 is a structural view showing the principle of the absolute displacement sensor of the invention.
Figure 2:
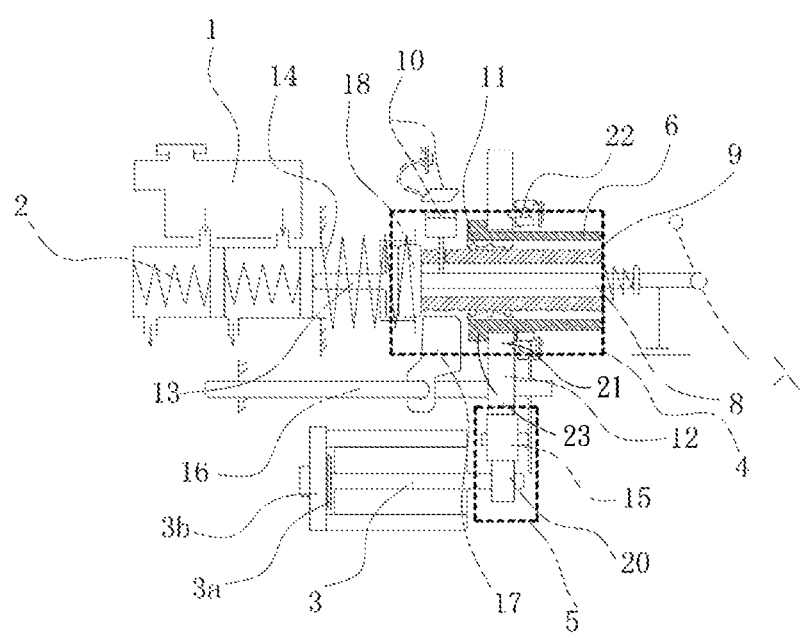
FIG. 2 is a structural view showing the principle of the relative displacement sensor of the invention.

As shown in FIGS. 1 and 2, an embodiment of the invention relates to a an electromechanical-magnetically integrated braking assistance device, which comprises an electric motor 3 having a position sensor 3a and an ECU 3b, an oil holder 1, a braking main cylinder 2, an assistant force generating portion 4 and a pedal input rod 8, wherein an absolute displacement sensor 7 or a relative displacement sensor 10 is connected to the pedal input rod 8, and an end of the pedal input rod 8 is inserted into the assistant force generating portion 4; a lead screw 9 is sleeved over the pedal input rod 8, and a ball nut 11 is sleeved over the lead screw 9; a ball nut bushing 6 is fixed to the ball nut 11 by being sleeved over the ball nut 11; a driven gear 12 is fixed to the ball nut bushing 6 by being sleeved over the ball nut bushing 6; and the electric motor 3 meshes with the driven gear 12 via a gear transmission mechanism 5 or a belt;

an end of the lead screw 9 which passes through the ball nut bushing 6 has an aperture, into which a feedback disc 18 is installed and an anti-rotation rod is installed by being inserted radially, wherein an end of the feedback disc 18 is connected to an end of an output rod 13 which is coaxially arranged with the lead screw 9 inside the assistant force generating portion 4, and another end of the output rod 13 extends into the braking main cylinder 2 and is connected to a piston of the braking main cylinder; and an upper end of the braking main cylinder 2 is connected with the oil holder.

As a supplement to the technical solution of the invention, an output end of the electric motor 3 is installed with a drive gear 20 which meshes with the a speed changing gear 15 which in turn meshes with the driven gear 12. A required speed ratio can be obtained by speed change performed by the speed changing gear, and the speed changing gear 15 can be replaced as actually required.

As a supplement to the technical solution of the invention, a pair of guide rods 16 are arranged symmetrically at two sides of the ball nut bushing 6, and a guide connecting rod 17, two ends of which are sleeved over the guide rods 16, is sleeved over the lead screw 9 between the feedback disc 8 and the ball nut bushing 6 for improving the stability of the lead screw 9 during sliding and also for preventing the lead screw 9 from rotating axially.

Further, restoring springs are sleeved over both the pedal input rod 8 and the output rod 13.

Further, the pedal input rod 8 extends out of an end of the lead screw 9 and is connected with an anti-rotation connecting block, and an end of the anti-rotation rod is connected with a side wall of the anti-rotation connecting block; a short groove is provided in a side wall of the feedback disc 18 for the anti-rotation rod to pass and slide through, and the anti-rotation rod can prevent the lead screw 9 from rotating axially when the ball nut 11 rotates at a high speed.

Further, a step is arranged at the outer side of an end of the ball nut bushing 6 which is close to the feedback disc 18, a plurality of axially arranged sliding grooves are evenly provided around the circumference of the ball nut bushing 6, and a central hole of the driven gear 12 is provided with protrusions for mating with the sliding grooves; the driven gear 12 abuts against the step and the protrusions are embedded into corresponding sliding grooves, and the driven gear 12 can slide along the sliding grooves in the ball nut bushing 6 so that the lead screw 9 can push the ball nut bushing 6 to continue sliding in case that the driven gear 12 does not work and the assistant force fails, thus realizing compulsory manual braking.

Further, a bearing is sleeved over the ball nut bushing 6 which closely abuts against the driven gear 12, an inner ring of the bearing is embedded into the driven gear, and an outer ring of the bearing is embedded into a housing. Since the ball nut bushing 6 is required to rotate axially with the ball nut 11, a bearing 22 is required for providing a radial support; the bearing 22 rotates with the rotation of the driven gear 12, and supports the rotation of the ball nut bushing 6 by being connected to the driven gear 12, which will have no influence on the axial movement of the ball nut bushing 6.

In an embodiment of the invention, the driver acts upon a pedal assembly so that the pedal input rod 8 generates a displacement; the absolute displacement sensor 7 or the relative displacement sensor 10 is connected to the pedal input rod 8, and the generated displacement signal is transmitted to the ECU, which controls the electric motor 3 to rotate in a forward direction; by means of gear transmission, the driven gear 12 is made to rotate, and drives the ball nut 11 to rotate; the ball nut 11 converts the rotation movement into a linear movement of the lead screw 9 and compresses the feedback disc 18; the feedback disc 18 deforms, and an end of the pedal input rod 8 abuts against the output rod 13 and generates a servo force according to a predetermined servo ratio.

The input force and the servo force cooperate to transmit the forces to the braking main cylinder 2 so as to generate a hydraulic force which is transmitted to braking wheel cylinders, thus generating braking forces eventually.

When braking is cancelled, the pedal input rod 8 is retreated, and the absolute displacement sensor 7 or the relative displacement sensor 10 transmits the signal to the ECU, which controls the electric motor 3 to rotate in a reverse direction; the servo force is decreased according to the servo ratio until the braking forces are cancelled.

The invention uses the absolute displacement sensor 7 or the relative displacement sensor 10 to detect the braking intension of the driver. By using PID control, a displacement signal is analyzed, an absolute displacement amount at the zero position of the pedal rod is calculated, and then the electric motor is controlled to apply a corresponding assistant force. By using a ball screw as a force-transmitting device, a rotating movement of the electric motor is converted into a linear movement. By using a gear reduction mechanism or a belt mechanism, the rotating movement of the electric motor is transmitted to the ball screw. By using the anti-rotation mechanism, the lead screw is prevented from being rotated when the rotating movement is converted into the linear movement, which will otherwise result in a reduction in transmission efficiency. By using the feedback disc which is made from an elastic material, a smooth leap increase and a stable assistance ratio is realized. By using flanges on the gear to mate with grooves in the ball nut bushing, it is realized that the gear drives the ball screw to rotate, and meanwhile, it is ensured that when there is no assistant force, the ball screw can be successfully disengaged from the gear, thus realizing manual braking.

What is claimed is:

1. An elenctromechanical-magnetically integrated braking assistance device, comprising an electrical motor (3) having a position sensor (3) and an ECU (3b), an oil holder (1), a braking main cylinder (2), an assistant force generating portion (4), and a pedal input rod(8), characterized in that an absolute displacement sensor (7) or a relative displacement sensor (10) is connected to the pedal input rod (8), and an end of the pedal input rod (8) is inserted into the assistant force generating portion (4); a lead screw (9) is sleeved over the pedal input rod (8), and a ball nut (11) is sleeved over the lead screw (9); a ball nut bushing (6) is fixed to the ball nut (11) by being sleeved over the ball nut (11); a driven gear (12) is fixed to the ball nut bushing (6) by being sleeved over the ball nut bushing (6); and the electric motor (3) meshes with the driven gear (12) via a gear transmission mechanism (5) or a belt;

an end of the lead screw (9) which passes through the ball nut bushing (6) has an aperture, into which a feedback disc (18) is installed, wherein an end of the feedback disc (18) is connected to an end of an output rod (13) which is coaxially arranged with the lead screw (9) inside the assistant force generating portion (4), and another end of the output rod (13) extends into the braking main cylinder (2) and is connected to a piston of the braking main cylinder;

and an upper end of the braking main cylinder (2) is connected with the oil holder (1).

2. The electromechanical-magnetically integrated braking assistance device according to claim 1, wherein a pair of guide rods (16) are arranged symmetrically at two sides of the ball nut bushing (6), and a guide connecting rod (17), two ends of which are sleeved over the guide rods (16), is sleeved over the lead screw (9) between the feedback disc (18) and the ball nut bushing (6).

3. The electromechanical-magnetically integrated braking assistance device according to claim 2, wherein restoring springs (14) are sleeved over both the pedal input rod (8) and the output rod (13).

4. The electromechanical-magnetically integrated braking assistance device according to claim 3, wherein a step (23) is arranged at the outer side of an end of the ball nut bushing (6) which is close to the feedback disc (18), a plurality of axially arranged sliding grooves are evenly provided around the circumference of the ball nut bushing (6), and a central hole of the driven gear (12) is provided with protrusions (21) for mating with the sliding grooves, wherein the driven gear (12) abuts against the step (23) and the protrusions (21) are embedded into corresponding sliding grooves.

5. The electromechanical-magnetically integrated braking assistance device according to claim 4, wherein a bearing (22) is sleeved over the ball nut bushing (6) which closely abuts against the driven gear (12), an inner ring of the bearing (22) is embedded into the driven gear (12), and an outer ring of the bearing (22) is embedded into a housing.

6. The electromechanical-magnetically integrated braking assistance device according to claim 1, wherein restoring springs (14) are sleeved over both the pedal input rod (8) and the output rod (13).

7. The electromechanical-magnetically integrated braking assistance device according to claim 6, wherein a step (23) is arranged at the outer side of an end of the ball nut bushing (6) which is close to the feedback disc (18), a plurality of axially arranged sliding grooves are evenly provided around the circumference of the ball nut bushing (6), and a central hole of the driven gear (12) is provided with protrusions (21) for mating with the sliding grooves, wherein the driven gear (12) abuts against the step (23) and the protrusions (21) are embedded into corresponding sliding grooves.

8. The electromechanical-magnetically integrated braking assistance device according to claim 7, wherein a bearing (22) is sleeved over the ball nut bushing (6) which closely abuts against the driven gear (12), an inner ring of the bearing (22) is embedded into the driven gear (12), and an outer ring of the bearing (22) is embedded into a housing.

9. The electromechanical-magnetically integrated braking assistance device according to claim 1, wherein an output end of the electric motor (3) is installed with a drive gear (20) which meshes with the a speed changing gear (15) which in turn meshes with the driven gear (12).

10. The electromechanical-magnetically integrated braking assistance device according to claim 9, wherein restoring springs (14) are sleeved over both the pedal input rod (8) and the output rod (13).

11. The electromechanical-magnetically integrated braking assistance device according to claim 10, wherein a step (23) is arranged at the outer side of an end of the ball nut bushing (6) which is close to the feedback disc (18), a plurality of axially arranged sliding grooves are evenly provided around the circumference of the ball nut bushing (6), and a central hole of the driven gear (12) is provided with protrusions (21) for mating with the sliding grooves, wherein the driven gear (12) abuts against the step (23) and the protrusions (21) are embedded into corresponding sliding grooves.

12. The electromechanical-magnetically integrated braking assistance device according to claim 11, wherein a bearing (22) is sleeved over the ball nut bushing (6) which closely abuts against the driven gear (12), an inner ring of the bearing (22) is embedded into the driven gear (12), and an outer ring of the bearing (22) is embedded into a housing.

* * * * *